United States Patent [19]

Ocuin

[11] Patent Number: 4,867,596
[45] Date of Patent: Sep. 19, 1989

[54] CONNECTOR FOR ELONGATE ELEMENTS

[76] Inventor: Morton Ocuin, 540 Manida St., Bronx, N.Y. 10474

[21] Appl. No.: 228,256

[22] Filed: Aug. 4, 1988

[51] Int. Cl.$^4$ ............................................. F16B 1/00
[52] U.S. Cl. ................................. 403/170; 403/395; 403/398; 403/297
[58] Field of Search ............... 403/395, 399, 398, 170, 403/297

[56] References Cited

U.S. PATENT DOCUMENTS

| | | | |
|---|---|---|---|
| 318,195 | 5/1885 | Miller | 403/395 X |
| 681,070 | 8/1901 | Oran | 403/395 |
| 869,332 | 10/1907 | Schwarz | 403/395 |
| 2,476,863 | 7/1949 | Hawes | 403/395 |
| 3,565,380 | 2/1971 | Langren | 403/395 X |

FOREIGN PATENT DOCUMENTS 1361398  4/1964  France ................................. 403/297

*Primary Examiner*—Andrew V. Kundrat
*Attorney, Agent, or Firm*—Robert W. Fiddler

[57] ABSTRACT

A connector, for releasably securing and supporting as many as three elongate elements such as tubing, piping and the like along mutually perpendicular axes. The connector comprises a first U-shaped member, having parallel spaced arms extending from a base, with aligned openings in the arms spaced from the base. The openings are shaped and sized to receive one of the elongate elements therethrough. A second elongate element may be inserted into the space between the arms of the U, the base portion of the U and the first elongate element, perpendicularly to the latter. A lock mechanism on the U-shaped member is provided to secure the elements in frictional engagement. A second U-shaped member having parallel spaced arms connected by a base has its base attached to the base of the first U-shaped member. The spaced arms of the second U-shaped member are shaped and dimensioned to engage the end of a third elongate element, which is held in position by a second locking mechanism.

16 Claims, 2 Drawing Sheets

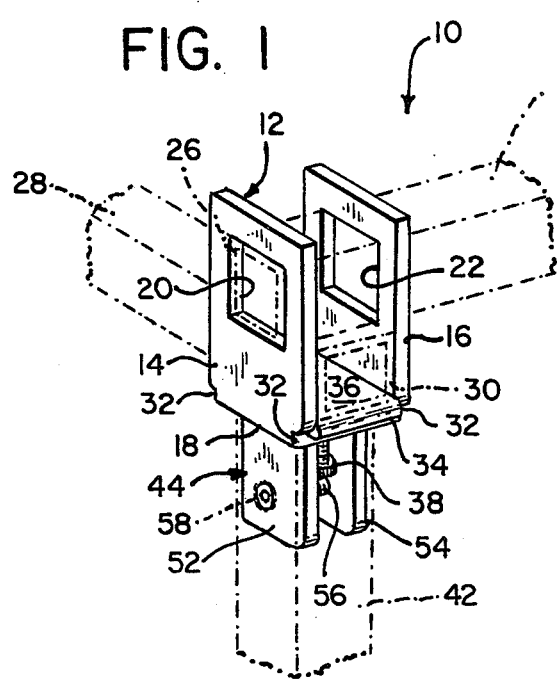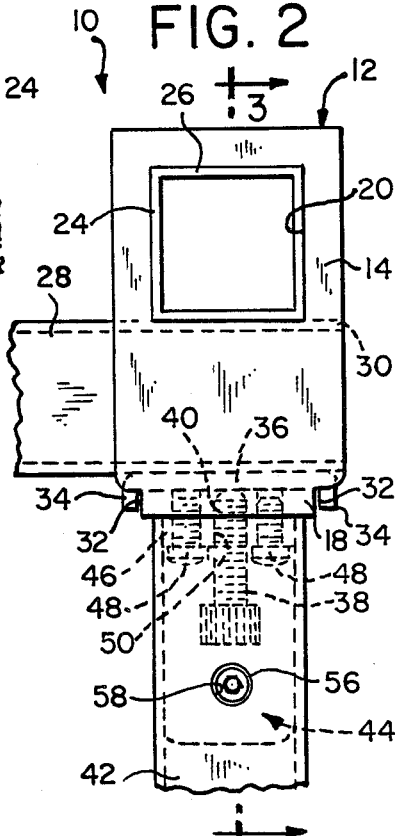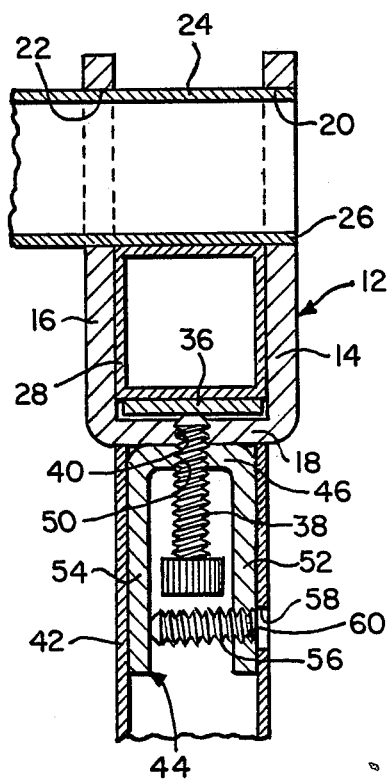

CONNECTOR FOR ELONGATE ELEMENTS

BACKGROUND OF THE INVENTION

This invention relates to the art of tubing connectors, and more particularly to connectors for tubing employed in forming furniture or the like, which is optionally shipped in a knockdown state.

Connectors for joining two or more elongate tubes or rods with their axes extending in mutually perpendicular directions, such as may be used for holding together the ends of tubing meeting at corners of frames for furniture and the like have been well-known and in use for many years. Most of these connectors have a plurality of projections extending perpendicularly from a center hub, each projection adapted to be ensleeved by a tube, which is then fastened thereto, such for example as shown by prior U.S. Pat. Nos. 3,854,831; 3,977,800 and 3,620,558. Such prior art devices require relatively intricate castings and are limited in use only to corner construction, and generally require a differently sized connector for differently sized tubes.

SUMMARY OF THE INVENTION

It is with the above considerations in mind that the present tubing connector has been evolved, providing a connector which may be employed to join up to three tubes with their axes extending in mutually perpendicular directions, with the tubes connected either at their corners, or at a midpoint of the tube.

It is accordingly an object of this invention to provide a connector for joining as many as three elongate members with their axes extending perpendicularly to each other, the connector being of simple and economic construction, widely adaptable, and easy to use.

Another object of this invention is to provide a connector capable of releasably securing together, at right angles to each other, elements of tubing, piping and/or solid rod either at their ends to form a corner joint or intermediate their lengths.

A further object is to provide a connector for joining elongate tubes to rods.

Another object is to provide a connector in which one size of connector may be employed to connect a range of tube or rod sizes.

These and other objects of the invention which will become hereafter apparent are attained by forming a connector for joining and securely holding as many as three elongate elements to extend along mutually perpendicular axes of a first U-shaped yoke member with spaced parallel arms of the U-shaped member extending from a base. Each arm is formed with an opening spaced from the base, the openings in each arm being aligned, and shaped and sized to receive slidably therethrough the first of the elongate elements to be connected. A second elongate element to be connected may be inserted through the U-shaped member at right angles to the first elongate member, in the the space between it and the base portion of the first U-shaped member. Locking means are provided for exerting pressure against the second elongate element to force it into firm frictional engagement with the first elongate member. When the locking means are actuated, the two elongate elements are held in an orientation with their axes perpendicular to each other. A second U-shaped member having spaced parallel arms extending from a base is secured by its base to the base of the first U-shaped member. This second U-shaped member is sized and shaped to fit slidably within the end of a third elongate member, which may be secured thereon with its axis extending perpendicular to the axes of the other elongate elements.

A feature of the invention resides in the fact that the locking mechanism permits a single connector to be employed for interconnecting a range of differently sized tubes or rods.

DESCRIPTION OF THE DRAWINGS

FIG. 1 is a perspective view of a connector made in accordance with the invention, the elongate elements connected thereby being of square cross-section shown in phantom for clarity;

FIG. 2 is an enlarged left side elevational view of a connector as shown in FIG. 1, with the connected elements shown in solid line;

FIG. 3 is a vertical sectional view of the connector taken along lines 3—3 of FIG. 2;

DESCRIPTION OF THE PREFERRED EMBODIMENTS

Figure 4:
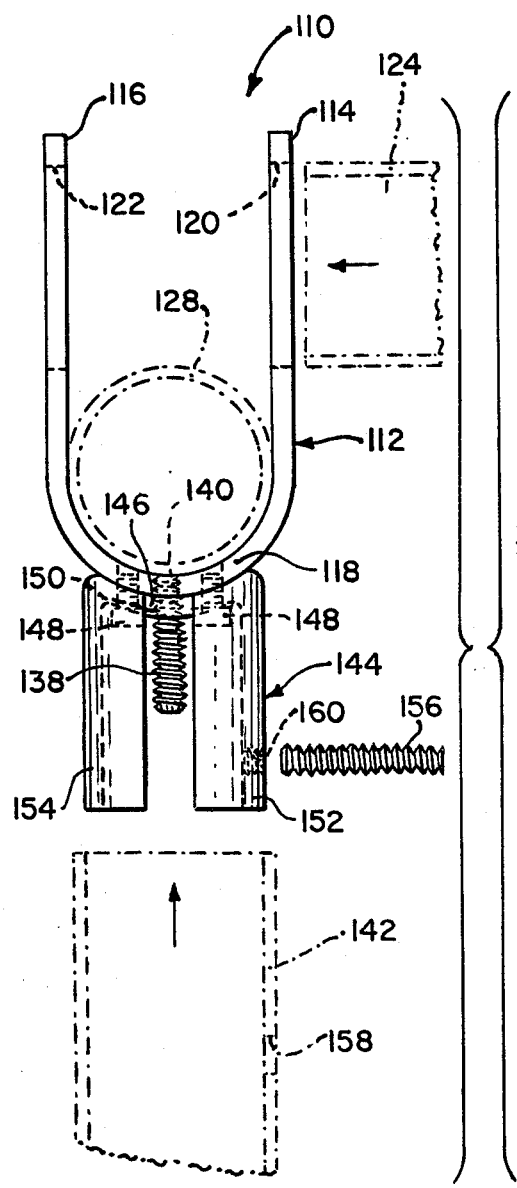
FIG. 4 is a front elevational view of a second embodiment of the connector, with the elongate elements to be connected being of circular cross-section shown in phantom.

Referring now more particularly to the drawings, like numerals in the various figures will be employed to designate like parts.

As illustratively shown in FIGS. 1-3, the connector, generally designated 10, is formed of a first U-shaped member 12 having spaced parallel arms 14 and 16 connected by a flat horizontally disposed base portion 18. In the illustrated view, the arms 14 and 16 extend vertically. Arms 14 and 16, adjacent their free ends, are provided respectively with matching square openings 20 and 22, through both of which tubing element 24 may extend. In FIGS. 1-3, tube 24 is illustratively shown of rectangular cross-section, and positioned with its end face aligned with the outer face of arm 14.

Arms 14 and 16 are spaced apart sufficiently and opening 20 and 21 are spaced sufficiently from base 18 to permit a second square in cross-section elongate tubing element 28 to be introduced slidably under and transverse to tubing 24. As illustrated, the end face 30 of tubing 28 is positioned in alignment with the outer edges of arms 14 and 16.

As illustratively shown, it is preferred that base 18 of U-shaped member 12 be narrower than arms 14 and 16 to provide a recess 32 with respect to arms 14 and 16. This recess between arms 14 and 16 accomodates depending guide lips 34 of a bearing or pressure plate 36. Set screw 38 is centrally disposed and threaded through base portion 18 of member 12 at 40, as best seen FIG. 2.

With tubing elements 24 and 28 in place, as illustratively shown, the tightening of set screw 38 moves bearing plate 36, guided by lips 34, against tubing element 28, which in turn is moved in the channel formed between arm portions 14 and 16 to put pressure against tubing element 24, wedging it in openings 20 and 22, thus frictionally locking tubing elements 24 and 28 and member 12 securely together.

In the manner illustrated in FIGS. 1-3 and described above, a planar corner assembly of perpendicular tubing elements lying in the same plane is formed. However, by sliding either tubing 24, tubing 28, or both, further through first U-member 12 before locking, any desired connection between cross-crossing tubing elements intermediate of their lengths may be achieved. U-shaped member 12 may be positioned in a direction other than vertical, the tubing elements connected thereto will remain perpendicular to each other and coplanar, but not in the horizontal orientation illustrated in FIGS. 1-3.

For connecting a third tubing element 42 in mutually perpendicular relationship with tubing elements 24 and 28, connector 10 further comprises second U-shaped member 44, positioned so that its base 46 abuts base 18 of U-member 12 and is attached thereto. In the illustrated embodiment attachment is by means of screws 48 (FIG. 2). However, as is apparent, the bases may be connected by rivets, or formed integrally if cast of metal or molded of plastic. Base portion 46 of second U-shaped member 44 has a centrally disposed threaded opening 50, through which set screw 38 passes into threaded engagement with base 18 at 40.

Spaced parallel arms 52 and 54 of second U-shaped member 44 extend from base portion 46, and member 44 is sized and shaped so that a third tubing element 42 may fit slidably thereon.

Set screw 56 extends through access opening 58 in tubing 42. Set screw 56 is tightened through threaded opening 60 of U-member arm 52 into arm-spreading pressure contact with arm 54, whereby tubing element 42 is held firmly in place on connector 10.

Figure 5:
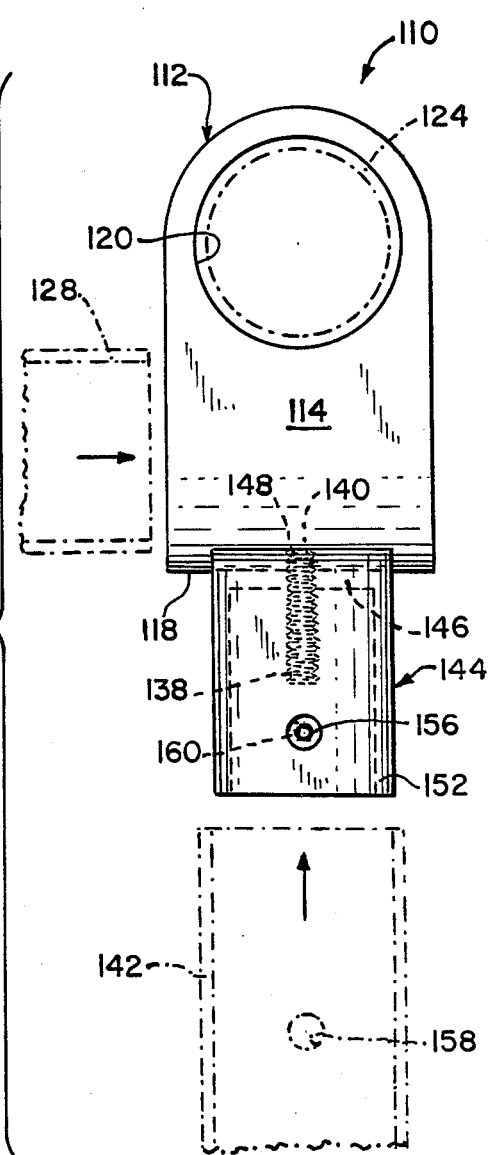
FIG. 5 is a right side elevational view of the connector of FIG. 4.

The connector 110 illustrated in FIGS. 4 and 5 is designed to specifically accomodate piping or tubing which is circular in cross-section. In this embodiment of the invention, first U-shaped member 112 comprises spaced parallel upstanding arms 114 and 116 connected by rounded base 118.

Circular openings 120 and 122 are provided in arms 114 and 116, respectively, at a spaced distance from base 118. Openings 120 and 122 are dimensioned to receive and support circular in cross-section tubing element 124 adjacent the free end of U-shaped member 112, which is proportioned to slidably accept a second circular in cross-section tubing element 128 transversely under tubing 124 and resting on the inner circumference of U-member 112.

Set screw 138, threadedly engaged in bore 140 at the center of base 118, may be tightened to create frictional locking engagement between tubing elements 124 and 128 and inner surfaces of openings 120 and 122.

Analogous to connector 10 of the FIGS. 1—1 embodiment, connector 110 is formed with a second U-shaped member 144, connected to first U-shaped member 112. This second U-shaped member is shaped to fit within the interior of a third circular in cross-section tubing element 142 for connection therewith. Member 144 comprises base 146, concavely shaped as best seen in FIG. 4 to fit in mating relationship with base 118 of U-member 112. Bases 146 and 118 as illustratively shown may be joined by attachment screws 148, as well as by set screws 138 threadedly held in bore 150.

Arms 152 and 154 of second U-shaped member 144 are curved to mate with tubing element 142 when assembled.

Locking set screw 156, introduced through access opening 158 in tubing element 142, may be turned in threaded opening 160 in arm 152 until pressure contact with arm 154 spreads arms 152 and 154 into secure frictional engagement with the tubing mounted thereon.

OPERATION

While two preferred embodiments have been shown and described in detail, it will be apparent to those skilled in the art that other modifications, combinations and substitutions may be made without departing from the concepts and spirit of the present invention. Thus, for example, the novel connector herein disclosed may be adapted to accomodate tubing or piping of other cross-sectional shapes, which might be rectangular, polygonal, triangular or elliptical. It is possible to combine different shapes in the same connector assembly, such as square-shaped horizontally disposed tubing elements and round vertical support tubing. Solid rods may be substituted for the first two tubing elements above disclosed as connected by first U-shaped members 14 or 114.

The connector may be fabricated of metal or plastic. Where made of metal, conventional metal fabricating techniques are employed to form the components of the connectors. Thus, in the illustrated embodiments, the U-shaped members were formed by stamping from sheet steel, bent to desired contour and assembled. The connectors may also be cast, or molded of plastic.

In use, the connectors after fabrication of desired size and contour may be employed as above described to join up to three elongate tubular elements extending through mutually perpendicular axes.

The above disclosure has been given by way of illustration and elucidation, and not by way of limitation, and it is desired to protect all embodiments of the herein described inventive concept within the scope of the following claims.

What is claimed is:

1. A connector for releasably securing and supporting a plurality of elongate elements such as tubing, piping and the like extending along mutually perpendicular axes, said connector comprising: a substantially U-shaped member having a pair of parallel spaced arms extending from a base portion, each of said arms having an opening adjacent its free end matching and aligned with the opening in the other of said arms, both said openings dimensioned to permit introduction therethrough and retention therein of a first elongate element to be connected, whereby, with said first elongate element in place supported in said openings, a space is defined by said parallely extending arms, said base portion of said U-shaped member and the first elongate element, said space dimensioned to permit the positioning in said space of a second elongate element to be connected transversely to the first elongate element; a second substantially U-shaped member which comprises a center base portion and a pair of spaced parallel arms extending from and substantially perpendicular to said center base portion, said second U-shaped member being secured to said first U-shaped member in base-to-base relationship, said pair of spaced parallel arms on said second U-shaped member extending in a direction opposite the direction of extension of said pair of parallel arms o said first U-shaped member, and shaped and dimensioned to be ensleeved by the hollow end of a third elongate element to be connected, the third elongate element thereby being positioned on the connector in mutually perpendicular orientation to the first and said second elongate elements.

2. A connector as in claim 1, having locking means mounted on said U-shaped member for exerting pressure to urge the second elongate element into engagement with the first elongate element and the first elongate element into engagement with at least a portion of the openings in said side arms of said U-shaped member.

3. A connector as in claim 1, wherein said locking means comprises a set screw for threaded engagement with a centrally disposed bore in said base portion of said U-shaped member.

4. A connector as in claim 3, comprising a bearing plate positioned between said base portion of said U-shaped member and the second elongate element, whereby, when said set screw is turned in said threaded bore to lock the connector assembly, said bearing plate is moved by said set screw against the second elongate element.

5. A connector as in claim 4, wherein said bearing plate has a guide flange at each end thereof, and wherein the free edges of said base portion of said U-shaped member are each recessed with respect to said arm portions, said recesses accomodating said guide flanges within the profile of said U-shaped member.

6. A connector as in claim 1, wherein said second U-shaped member further comprises means for releasably securing said third elongate element thereto.

7. A connector as in claim 6, wherein said securing means comprises a second set screw positioned in a threaded bore disposed in one of said pair of arms in said second U-shaped member, which when tightened, bears against the other of said arms, causing said arms to be spread apart sufficiently to firmly engage the inner walls of the third elongate element.

8. A connector as in claim 1, wherein said first and second elongate elements are positioned in said U-shaped member so that the respective captive ends of said elongate elements are aligned with the outer profile of said U-shaped member, and a corner connector assembly is thus achieved.

9. A connector as in claim 1, wherein at least one of the first and second elongate elements is positioned in said U-shaped member at a point intermediate of the length of the member.

10. A connector as in claim 1, wherein the elongate elements to be connected are formed of tubing.

11. A connector as in claim 10, wherein the tubing is square in cross-section.

12. A connector as in claim 1, wherein the elongate elements to be connected are formed of tubing.

13. A connector as in claim 12, wherein the tubing is square in cross-section.

14. A connector as in claim 1, wherein the elongate elements to be connected are formed of piping circular in cross-section.

15. A connector as in claim 1, wherein the elongate elements to be connected are all formed of piping circular in cross-section.

16. A connector as in claim 1, wherein the elongate elements to be connected are of different cross-sectional configuration.

* * * * *